Aug. 14, 1945.　　　　E. W. ANDEREGG　　　　2,382,528
HAMMOCK SUPPORT
Filed Aug. 19, 1943
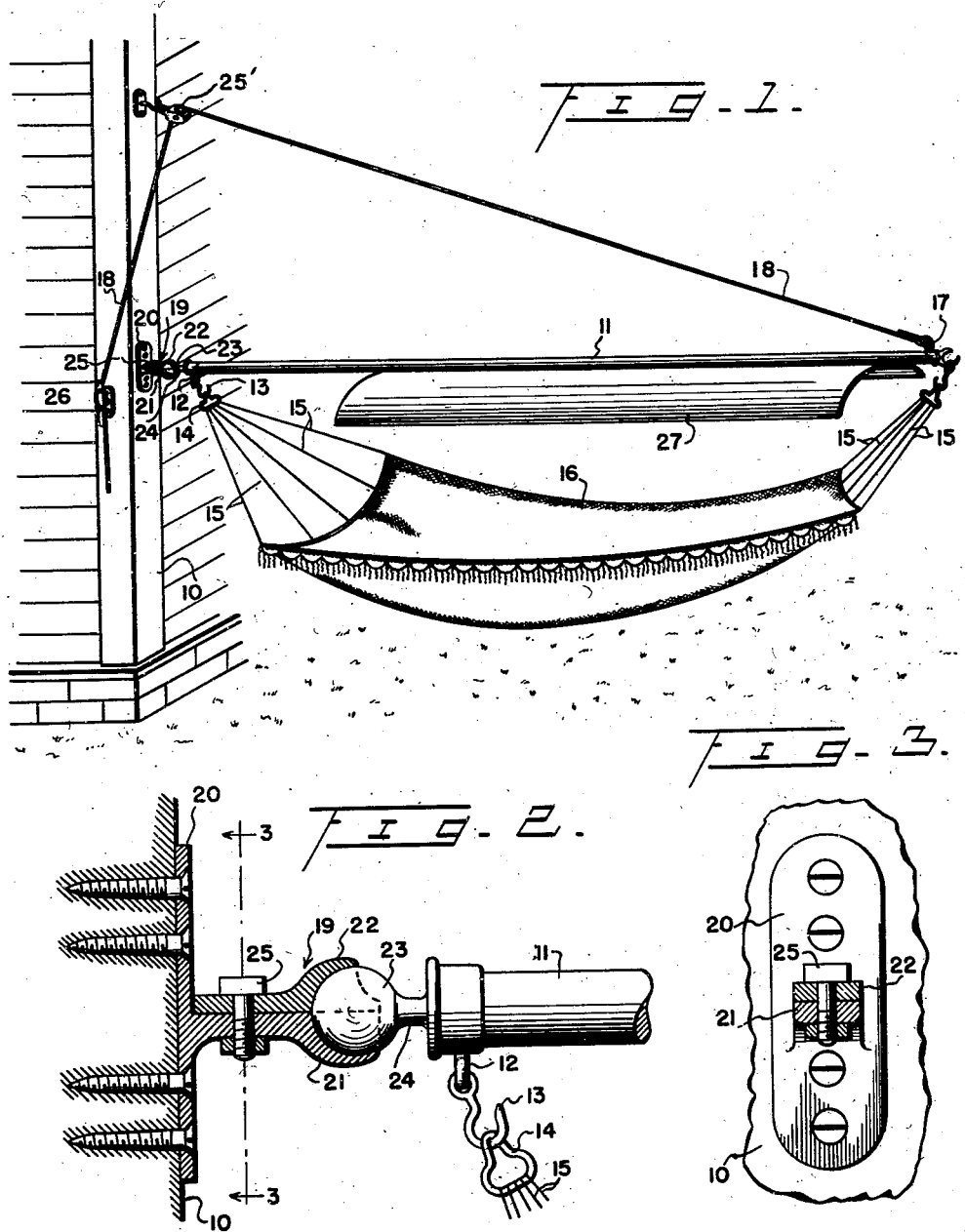
Inventor
EDWARD W. ANDEREGG Patented Aug. 14, 1945

2,382,528

UNITED STATES PATENT OFFICE 2,382,528

HAMMOCK SUPPORT

Edward W. Anderegg, Algoma, Wis., assignor to Algoma Net Company, Algoma, Wis., a corporation of Wisconsin Application August 19, 1943, Serial No. 499,274

3 Claims. (Cl. 5—127)

This invention relates to the class of supports and has to do particularly with an improved means of supporting or swinging a hammock.

As is well known, in order to properly hang a hammock, two fixed points of suspension must be had, spaced the proper distance apart. Such properly spaced supports, however, are not always available and, therefore, the present invention has as an important object to provide a novel hammock suspension means or support which provides its own two points of suspension and may be attached to or mounted upon a single vertical support, such as a post or building wall, either at a corner or upon the side of the latter.

Another object is to provide a hammock support which is so designed that when not in use it may be swung vertically to an out-of-the-way position, either with the hammock attached or removed.

The invention will be best understood from a consideration of the following detailed description when taken in association with the accompanying drawing, it being understood, however, that minor changes may be made in the construction so long as such changes do not produce a departure from the invention as defined by the appended claims.

In the drawing:

Figure 1 is a view in perspective of a hammock support constructed in accordance with the present invention and showing the same in use.

Figure 2 is a detail view on an enlarged scale, partly in section and partly in side elevation of the pivot coupling between the hammock supporting pole and a supporting structure.

Figure 3 is a sectional view taken on the line 3—3 of Figure 2.

Referring now more particularly to the drawing, the numeral 10 designates a support upon which the hammock support or suspension means of the present invention may be mounted. Such support 10 is here shown as being a corner of a building, but it will be readily obvious that it may be in the form of a post, pole, tree or any other vertical object of requisite strength.

In accordance with the present invention there is provided a pole, bar or the like 11 having at each end a suitable means for attaching one end of a hammock thereto, such means being here shown as an eye 12, and a hook 13 connected therewith, over which may be engaged the usual ring or eye 14 of a hammock and to which the suspension cords 15, at the ends of the body of the hammock 16, are connected.

At the foot end also of the pole 11, a means, such as an eye or ring 17, is provided upon the top side of the pole for the attachment thereto of one end of a suspension cable 18, of steel or other material of proper strength.

At the head end of the pole 11, means is provided for pivotally coupling such end with the support 10. Such pivotal means is generally designated 19 and must be of a construction to allow for some swaying or swinging movement and particularly allow for swinging the pole upwardly to a vertical position, when the support or carrier is out of use.

One such pivotal means by which the desired movements of the pole may be accomplished is here illustrated as comprising a universal ball and socket coupling consisting of a plate 20 having a two-part socket made up of parts 21 and 22, and a ball 23 attached to the head end of the pole 11 by the neck portion 24. As shown, the ball is secured between the fixed socket part 21 and the removable part 22, such parts being held in operative relation by a nut and bolt 25.

The cable 18 is detachably connected to the support 10, at a suitable point above the pivotal connection, to provide the necessary angle of pull to maintain the pole 11 horizontal in the manner illustrated. If desired, the connecting means 25' may be in the form of a pulley through which the cable may be run and from which it may be extended down to a cleat or hook 26 to be secured in a suitable manner, both when the pole is "let down" to horizontal or operative position and when it is raised to inoperative position.

The pole 11 may also carry the canopy 27 of a length to substantially cover the hammock, whereby an occupant of the hammock will be effectively shielded from the sun. This canopy may be of suitable rigid material which is preferably transversely arcuate as shown and is secured to the underside of the pole with the convex side up. This construction not only will cause rain water to rapidly drain off but will make it easy to swing the pole into a position directly against the wall or other body to which it is attached since the side of the pole away from the canopy will be positioned against the wall, when the pole is raised.

It is also believed to be desirable to have the pole, canopy, etc., painted to match the building wall upon which it is mounted so that it will be relatively inconspicuous when not in use.

I claim:

1. A hammock support adapted for attachment to a wall or suitable supporting body, comprising a member formed to provide an open wall socket having a circular peripheral edge, means for securing said member to the supporting body, a pole having a ball at one end pivotally engaging said socket, said socket being arranged with respect to the member to direct the open side thereof outwardly away from the supporting body, said socket and ball providing a universal joint to facilitate the turning of the ball therein to a position in which the pole extends substantially vertically, hook members at the inner and outer ends of the pole for facilitating the attachment of a hammock to the pole, and means connected with the outer end of the pole for effecting the swinging of the pole on said pivot between the vertical and horizontal position.

2. A hammock supporting means as set forth in claim 1, in which the hook members at the ends of the pole comprise an eye rigid with the pole at one end and a hook attached to said eye, and a hook secured to the end of the pole remote from the ball and socket pivot.

3. A hammock support as set forth in claim 1, in which the means for securing the socket member to the supporting body comprises a plate apertured to have securing elements extended therethrough into the supporting body, the socket member being connected with one side of the plate to project forwardly therefrom.

EDWARD W. ANDEREGG.